United States Patent
Balkan et al.

(10) Patent No.: US 9,135,202 B2
(45) Date of Patent: Sep. 15, 2015

(54) BRIDGE CIRCUIT FOR BUS PROTOCOL CONVERSION AND ERROR HANDLING

(71) Applicant: Apple Inc., Cupertino, CA (US)

(72) Inventors: Deniz Balkan, Santa Clara, CA (US); Gurjeet S. Saund, Saratoga, CA (US); Shu-Yi Yu, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 360 days.

(21) Appl. No.: 13/760,795

(22) Filed: Feb. 6, 2013

(65) Prior Publication Data

US 2014/0223049 A1 Aug. 7, 2014

(51) Int. Cl.
  G06F 13/40 (2006.01)
  G06F 11/07 (2006.01)

(52) U.S. Cl.
  CPC ........ G06F 13/4027 (2013.01); G06F 11/0766 (2013.01); G06F 11/0772 (2013.01)

(58) Field of Classification Search
  CPC . G06F 13/40; G06F 13/4004; G06F 13/4009; G06F 13/4027; G06F 11/00; G06F 11/006; G06F 11/07; G06F 11/0766; G06F 11/0772; G06F 11/10
  See application file for complete search history.

(56) References Cited

U.S. PATENT DOCUMENTS

| 5,990,914 | A  * | 11/1999 | Horan et al. ............... 345/531 |
| 6,567,881 | B1 * | 5/2003  | Mojaver et al. ............. 710/313 |
| 6,658,508 | B1   | 12/2003 | Reiss et al. |
| 7,475,182 | B2   | 1/2009  | Matsuse et al. |
| 7,743,186 | B2   | 6/2010  | Bracamontes Del |
| 8,250,280 | B1 * | 8/2012  | Rohana et al. ............... 710/311 |
| 8,793,411 | B1 * | 7/2014  | Balkan et al. ............... 710/52 |
| 2010/0131692 | A1 * | 5/2010 | Nishizawa et al. .......... 710/310 |
| 2011/0055439 | A1 * | 3/2011 | Chen et al. ................ 710/57 |
| 2011/0225334 | A1 * | 9/2011 | Byrne et al. ............... 710/110 |
| 2012/0082171 | A1   | 4/2012  | Georgiou et al. |
| 2014/0304441 | A1 * | 10/2014 | Balkan et al. ............... 710/105 |

OTHER PUBLICATIONS

"LogiCORE IP AXI Bridge for PCI Express". Version 1.02.a. Xilinx, Inc. Jan. 18, 2012.*
"Example AXI design for a Logic Tile on top of AXI Versatile base boards". Application Note 151. ARM Limited. Jun. 2008. Document No. ARM DAI 0151G.*
"PCI 9080 I2O Compatible PCI Bus Master I/O Accelerator Chip". PLX Technology, Inc. 1998.*
"PCI Express to AMBA 3 AXI Bridge IP". Mentor Graphics Corporation. 2007.*

* cited by examiner

Primary Examiner — Thomas J Cleary
(74) Attorney, Agent, or Firm — Meyertons, Hood, Kivlin, Kowert & Goetzel, P.C.

(57) ABSTRACT

Embodiments of a bridge circuit and system are disclosed that may allow for converting transactions from one communication protocol to another. The bridge circuit may be coupled to a first bus employing a first communication protocol, and a second bus employing a second communication protocol. The bridge circuit may be configured to convert transactions from the first communication protocol to the second communication protocol, and convert transaction from the second communication protocol to the first communication protocol. In one embodiment, the bridge circuit may be further configured to flag transactions that cannot be converted from the second communication protocol to the first communication protocol. In a further embodiment, an error circuit coupled to the bridge circuit may be configured to detect flagged transactions.

17 Claims, 5 Drawing Sheets

BRIDGE CIRCUIT FOR BUS PROTOCOL CONVERSION AND ERROR HANDLING

BACKGROUND

1. Technical Field

This invention is related to the field of integrated circuit implementation, and more particularly to the implementation of communication bus error handling circuits.

2. Description of the Related Art

Computing systems may include one or more systems on a chip (SoC), which may integrate a number of different functions, such as, graphics processing, onto a single integrated circuit. With numerous functions included in a single integrated circuit, chip count may be kept low in mobile computing systems, such as tablets, for example, which may result in reduced assembly costs, and a smaller form factor for such mobile computing systems.

Each functional block included within an SoC may be designed in accordance to one of various design flows. The logical operation of some functional blocks may be described in a high-level computer language such as, e.g., Very-high-speed integrated circuit hardware description language (VHDL). Logic gate implementations of blocks described in such a fashion may be generated using logic synthesis and place-and-route design techniques. Other functional blocks, such as memories, phase-locked loops (PLLs), analog-to-digital converters (ADCs), may be designed in a full-custom fashion.

Functional blocks within an SoC may be connected to one another through a bus. Such busses may employ proprietary communications protocols or they may employ industry-standard communication protocols, such as, ARM Advanced Extensible Interface (AXI™), Peripheral Component Interconnect Express (PCIe®), ARM Advance Peripheral Bus (APB™), ARM Advanced High Performance Bus (AHB™), for example. Some SoC implementations may allow for multiple communication protocols to be employed between the various functional blocks included within the SoC.

SUMMARY OF THE EMBODIMENTS

Various embodiments of a bridge circuit are disclosed. Broadly speaking, a circuit and a method are contemplated in which a bridge circuit includes an interface unit coupled to a first bus employing a first communication protocol, a master unit coupled to the interface unit and a second bus employing a second communication protocol, and a slave unit coupled to the interface unit and the second bus. The interface unit may include a transmission unit configured to encode and transmit transactions on the first bus, and a receive unit configured to receive and decode transactions from the first bus. The master unit may be configured to convert transactions received from the second bus to the first communication protocol and transmit the converted transactions on the first bus through the interface unit. The slave unit may be configured to convert transactions received from the first bus through the interface unit to the second communication protocol.

In another embodiment, the master unit may be configured to flag a transaction that cannot be converted to the first communication protocol. To flag the transaction, the master unit may be configured to set one or more bits of the transaction to a pre-determined value.

In a further embodiment, the first communication protocol may allow read and write commands to exist on the first bus in a time-domain multiplexed fashion. The interface unit may include a multiplex unit. The multiplex unit may be configured to multiplex commands received from the master unit in a time-domain multiplexed fashion.

BRIEF DESCRIPTION OF THE DRAWINGS

The following detailed description makes reference to the accompanying drawings, which are now briefly described.

Figure 1:
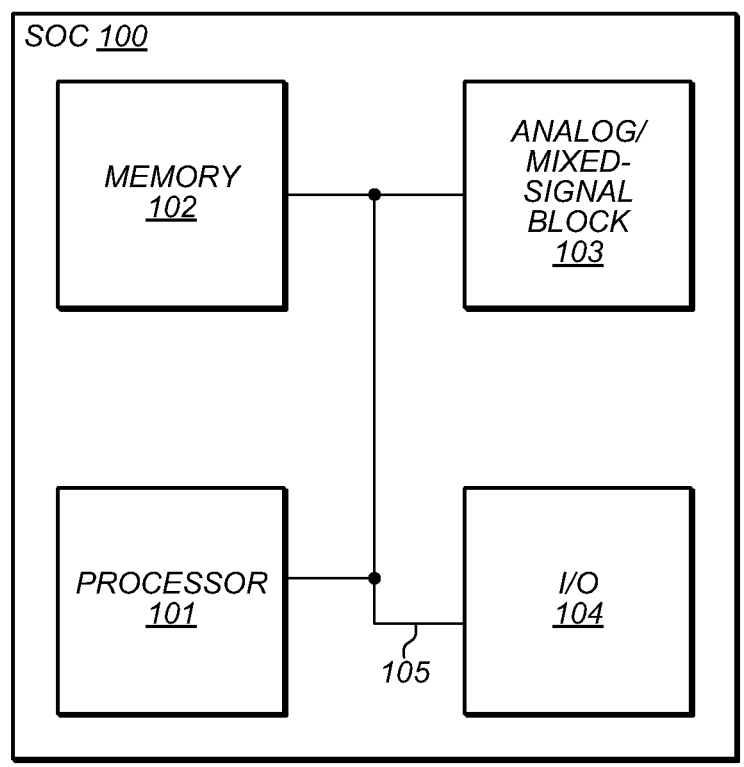
FIG. 1 illustrates an embodiment of a system-on-a-chip.

While the disclosure is susceptible to various modifications and alternative forms, specific embodiments thereof are shown by way of example in the drawings and will herein be described in detail. It should be understood, however, that the drawings and detailed description thereto are not intended to limit the disclosure to the particular form illustrated, but on the contrary, the intention is to cover all modifications, equivalents and alternatives falling within the spirit and scope of the present disclosure as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component. More generally, the recitation of any element is expressly intended not to invoke 35 U.S.C. §112, paragraph six interpretation for that element unless the language "means for" or "step for" is specifically recited.

DETAILED DESCRIPTION OF EMBODIMENTS

A system on a chip (SoC) may include one or more functional blocks, such as, e.g., a processor, which may integrate the function of a computing system onto a single integrated circuit. Some functional blocks may be designed using a full-custom design methodology, while other functional blocks may be implemented using logic synthesis and place-and-route. In some embodiments, some functional blocks may be re-used from a previous SoC design, while other may be designed for a specific task for a given SoC. Other functional blocks may be purchased from third party vendors for inclusion in an SoC design.

To implement an SoC, the various included functional blocks may be designed to communicate with one another. In some embodiments, the communication may be a point-topoint bus, which may allow two or more functional blocks to communicate with each other. Some embodiments, however, may include functional blocks whose functionality is shared by amongst the other functional blocks included on the SoC. To accommodate the sharing of functional blocks, a common communication bus may be employed.

In some embodiments, a common communication bus may employ one of various communication protocols to arbitrate requests and responses from various functional blocks coupled to the communication bus. In some embodiments, the communication protocols may be proprietary in nature, while in other embodiments, the communication protocols may conform to one of various industry standard communication protocols such as, ARM Advanced Extensible Interface (AXI™), ARM Advance Peripheral Bus (APB™), or ARM Advanced High Performance Bus (AHB™) for example.

In various embodiments, different functional blocks may employ different communication protocols. Some embodiments may employ bridge circuits to translate transactions from one communication protocol to another. Improved communication between functional blocks may be accomplished by tagging improperly translated transactions. Specialized error circuits may be included within functional blocks to detect and respond to the tagged transactions. The embodiments illustrated in the drawings and described below may provide techniques for implementing improved communication and error handling between functional blocks within an SoC.

System-on-a-chip Overview

A block diagram of an SoC is illustrated in FIG. 1. In the illustrated embodiment, the SoC 100 includes a processor 101 coupled to memory block 102, and analog/mixed-signal block 103, and I/O block 104 through internal bus 105. In various embodiments, SoC 100 may be configured for use in a mobile computing application such as, e.g., a tablet computer or cellular telephone.

Processor 101 may, in various embodiments, be representative of a general-purpose processor that performs computational operations. For example, processor 101 may be a central processing unit (CPU) such as a microprocessor, a microcontroller, an application-specific integrated circuit (ASIC), or a field-programmable gate array (FPGA). In some embodiments, processor 101 may include one or more register files and memories.

In some embodiments, processor 101 may implement any suitable instruction set architecture (ISA), such as, e.g., the ARM™, PowerPC™, or x86 ISAs, or combination thereof. Processor 101 may include one or more bus transceiver units that allow processor 101 to communication to other functional blocks within SoC 100 such as, memory block 102, for example.

Memory block 102 may include any suitable type of memory such as a Dynamic Random Access Memory (DRAM), a Static Random Access Memory (SRAM), a Read-only Memory (ROM), Electrically Erasable Programmable Read-only Memory (EEPROM), a FLASH memory, or a Ferroelectric Random Access Memory (FeRAM), for example. In some embodiments, memory block 102 may be configured to store program code or program instructions that may be executed by processor 101. Memory block 102 may, in other embodiments, be configured to store data to be processed, such as graphics data, for example.

It is noted that in the embodiment of an SoC illustrated in FIG. 1, a single memory block is depicted. In other embodiments, any suitable number of memory blocks and memory types may be employed.

Analog/mixed-signal block 103 may include a variety of circuits including, for example, a crystal oscillator, a phase-locked loop (PLL) or delay-locked loop (DLL), an analog-to-digital converter (ADC), and a digital-to-analog converter (DAC) (all not shown). In other embodiments, analog/mixed-signal block 103 may be configured to perform power management tasks with the inclusion of on-chip power supplies, voltage regulators, and clock frequency scaling circuitry. Analog/mixed-signal block 103 may also include, in some embodiments, radio frequency (RF) circuits that may be configured for operation with cellular telephone networks.

I/O block 104 may be configured to coordinate data transfer between SoC 101 and one or more peripheral devices. Such peripheral devices may include, without limitation, storage devices (e.g., magnetic or optical media-based storage devices including hard drives, tape drives, CD drives, DVD drives, etc.), audio processing subsystems, graphics processing subsystems, or any other suitable type of peripheral devices. In some embodiments, I/O block 104 may be configured to implement a version of Universal Serial Bus (USB) protocol or IEEE 1394 (Firewire®) protocol, and may allow for program code and/or program instructions to be transferred from a peripheral storage device for execution by processor 101.

I/O block 104 may also be configured to coordinate data transfer between SoC 301 and one or more devices (e.g., other computer systems or SoCs) coupled to SoC 100 via a network. In one embodiment, I/O block 104 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, I/O block 104 may be configured to implement multiple discrete network interface ports.

It is noted that the SoC illustrated in FIG. 1 is merely an example. In other embodiments, different functional blocks and different configurations of functions blocks may be possible dependent upon the specific application for which the SoC is intended. It is further noted that the various functional blocks illustrated in SoC 100 may operate at different clock frequencies, and may require different power supply voltages.

Intra-block Communication Protocols

Figure 2:
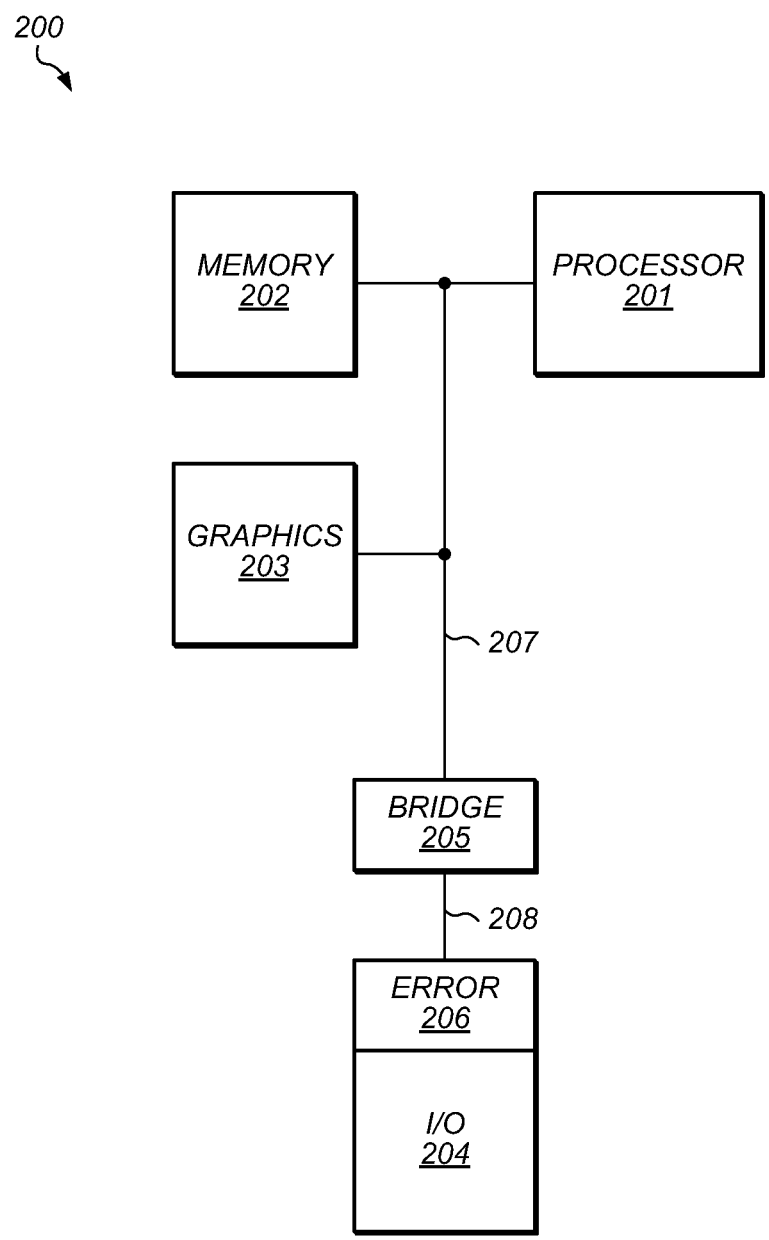
FIG. 2 illustrates another embodiment of a system-on-a-chip.

Turning to FIG. 2, another embodiment of an SoC is illustrated. In the illustrated embodiment, SoC 200 includes processor 201 coupled to memory 202, graphics controller 203, and bridge circuit 205 through bus 207. Bridge circuit 205 is further coupled to error circuit 206 through bus 208, and error circuit 206 is coupled to I/O block 204. Although only one bridge circuit is illustrated in SoC 200, in other embodiments, multiple bridge circuits with corresponding error circuits and functional blocks may be employed.

Functional blocks of an SoC may communicate with other functional blocks by sending commands and data (collectively referred to as "transactions") over a bus, such as bus 207. Such transaction may include, without limitation, read and write memory requests, and read and write peripheral input/output (PIO). A functional block may be configured as a master device or a slave device on the bus. A master device may be configured to initiate a transaction on the bus, while a slave device may be configured to only respond to requests. In some embodiments, there may be more than one device configured as a master connected to a bus.

Transactions on a bus, such as, e.g., bus 207 and bus 208, may be encoded by one of various communication protocols. For example, transactions may be encoded using a communication protocol such as ARM Advanced Extensible Interface (AXI™), Peripheral Component Interconnect Express (PCIe®), ARM Advance Peripheral Bus (APB™), ARM Advanced High Performance Bus (AHPB™), or any other suitable communication protocol. In some embodiments, different busses within an SoC may employ different communication protocols. For example, in SoC 200, bus 208 may encode transactions using one such communication protocol, while bus 207 may employ another communication protocol. Although SoC 200 shows two busses, it is noted that in other embodiments, additional busses with various communication protocols may be employed.

When multiple busses with different communication protocols are employed in an SoC, it may be necessary to convert transactions encoded with one communication protocol to another communication protocol. For example, in order for processor 201 to issue a PIO read or write request to I/O block 204, the request must be converted from the communication protocol employed on bus 207 to the communication protocol employed on bus 208. In some embodiments, the conversion may be performed by a bridge circuit, such as bridge circuit 205, for example.

Dependent upon the communication protocols employed, it may not be possible to convert some transactions from one communication protocol to another. In such cases, it may be necessary to signal an error has occurred and perform certain tasks (commonly referred to as "error handling") to prevent incorrect operation of the system, such as, e.g., SoC 200. In some embodiments, when a transaction is initiated by a functional block to another functional block residing on a different bus, the transaction may pass through a bridge circuit for conversion into the proper communication protocol for the recipient. The bridge circuit may then determine that the transaction cannot be converted. The determination may be the result of a comparison of the transaction to be converted against a pre-determined list of allowable transaction types. In some embodiments, disallowed transaction types may be determined on the basis if the converted transaction would generate an over read or write.

In other embodiments, a bridge circuit may mark (or "flag") transactions that the bridge circuit cannot convert to the desired communication protocol. The flagged transaction may then be transmitted onto the intended recipient. The intended recipient may then receive the flagged transaction, and noting the flag, may respond to the initiator of the transaction that the transaction could not be completed.

In some embodiments, functional blocks may include error circuits, such as error circuit 206, for example. The error circuits may monitor incoming transactions, and upon detection of a flagged transaction, issue a message to the initiator of the transaction. In other embodiments, an error circuit may also prevent (or stall) further incoming transactions. The error circuit may also continue to stall incoming transactions, until pending transactions have been completed by the error circuit's corresponding functional block.

It is noted that the SoC illustrated in FIG. 2 is merely an example. In other embodiments, different numbers of functional blocks, and different numbers of interface types are possible and contemplated.

Bridge Circuit Operation

Figure 3:
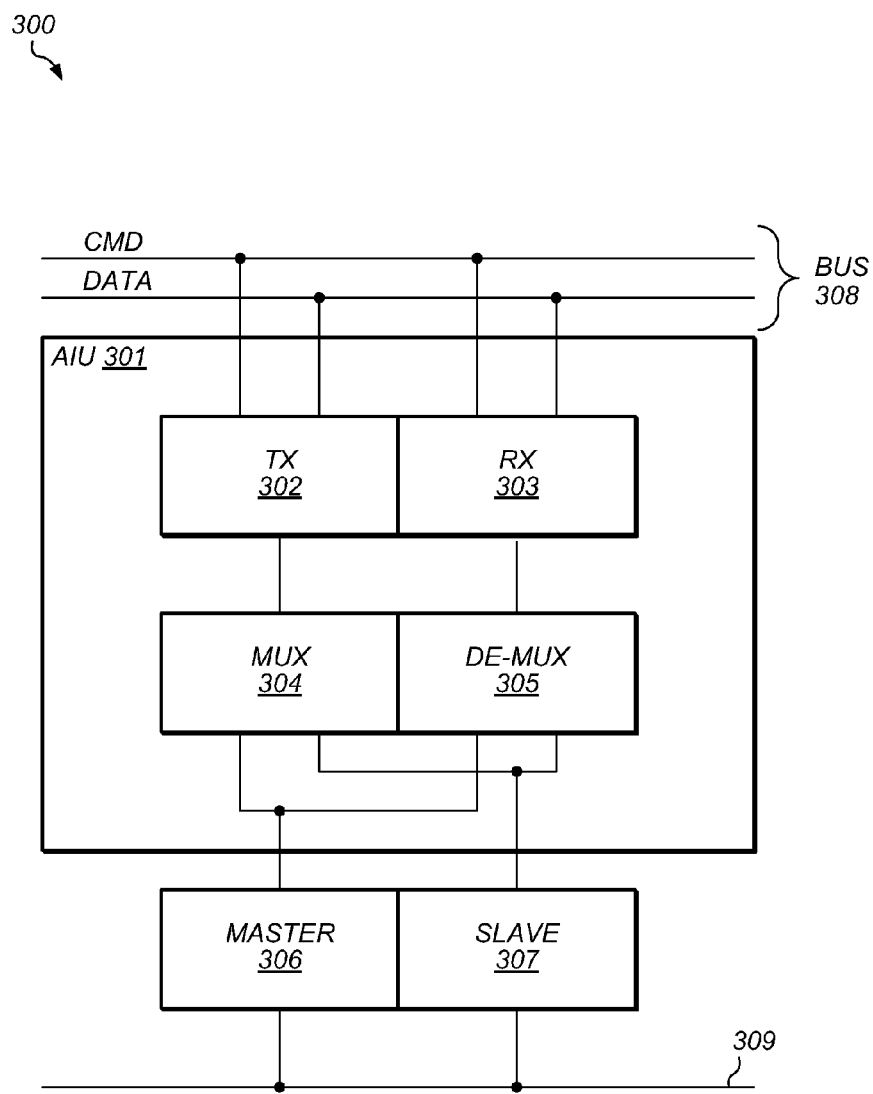
FIG. 3 illustrates an embodiment of a bridge circuit.

Turning to FIG. 3, an embodiment of a bridge circuit is illustrated. In the illustrated embodiment, bridge circuit 300 includes master unit 306 and slave unit 307 coupled to agent interface unit 301, which is, in turn, coupled to bus 308. Master unit 306 and slave unit 307 are further coupled to bus 309. In some embodiments, bus 308 and bus 309 may employ different communication protocols. For example, bus 309 may have no ordering restrictions between read and write transactions, while bus 308 may allow both read and write commands to exist on a single command bus in a time-domain multiplexed fashion. Although bus 309 is depicted as a single line in the embodiment illustrated in FIG. 3, bus 309 may employ multiple signal lines in other embodiments.

Agent interface unit 301 may include transmit unit 302 and receive unit 303. Transmit unit 302 may configured to encode and transmit transactions with the communication protocol employed by bus 308. Receive unit 303 may be configured to receive transactions from bus 308 and decode them. In some embodiments, transmit unit 302 and receive unit 303 may be coupled to bus 308 through separate command and data signal lines.

In various embodiments, agent interface unit 301 may include multiplex circuit 304 and de-multiplex circuit 304. In embodiments where bus 308 allow read and write commands to exist in a time-domain multiplexed fashion, multiplex circuit 304 may be configured to encode commands from commands received from master unit 306 and slave unit 307. De-multiplex circuit 305 may be configured to decode the time-domain multiplexed commands on bus 308 in preparation for use by master unit 306 and slave unit 307. In some embodiments, agent interface unit 301 may also include arbitration circuits that may be configured to assist in sending and receiving commands and data via bus 308.

Master unit 306 may be configured for converting requests on bus 309 intended for a functional block coupled to bus 308, and then converting any response from the target functional block on bus 308 back to communication protocol of bus 309 and sending the response back to initiating entity on the bus 309. In some embodiments, the conversion process may employ multiplex circuit 304 and de-multiplex circuit 305.

In cases where a request is made by a functional block on bus 308 to a functional block on bus 309, slave unit 307 may be configured to convert the request from the communication protocol of bus 308 to the communication protocol of bus 309. Slave unit 307 may also be configured to convert a response on bus 309 to the communicator protocol of bus 308. In some embodiments, the conversion process may employ multiplex circuit 304 and de-multiplex circuit 305.

It is noted that the bridge circuit illustrated in FIG. 3 is merely an example. In other embodiments, different circuit blocks, and different configurations of circuit blocks are possible and contemplated.

Figure 4:
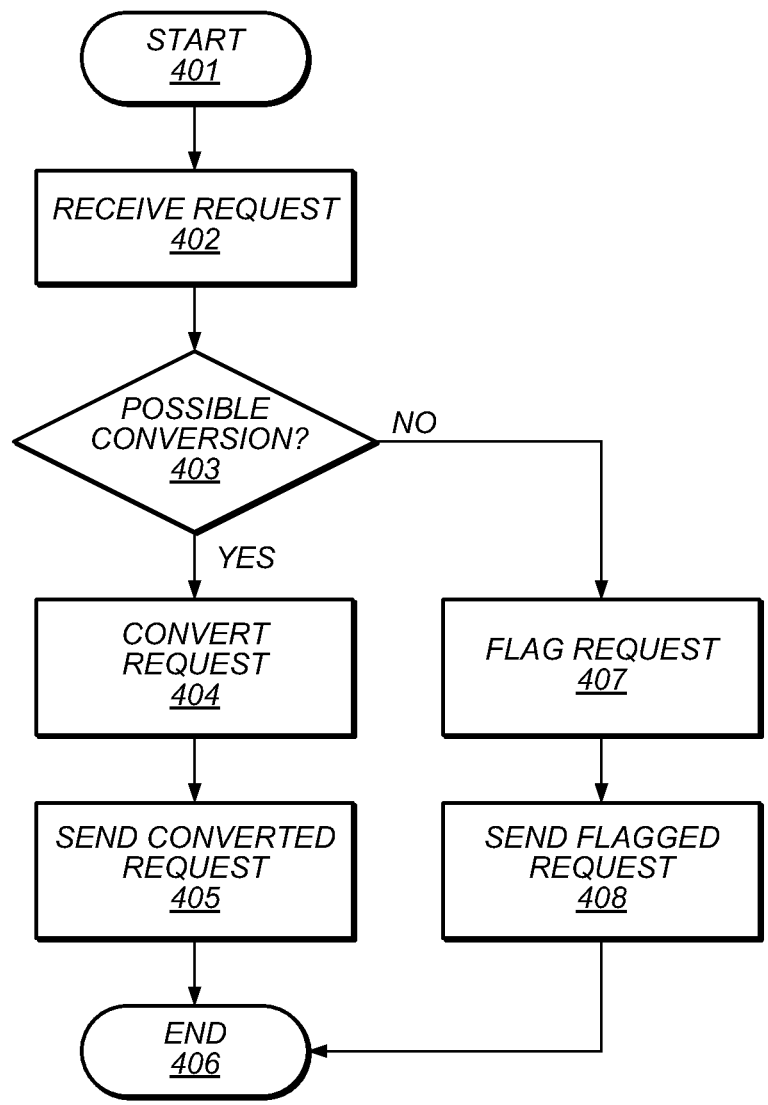
FIG. 4 illustrates a flowchart of an example method for operating a bridge circuit.

An example flowchart depicting the operation of a bridge circuit, such as, e.g., bridge circuit 300 as depicted in FIG. 3, is illustrated in FIG. 4. Referring collectively to bridge circuit 300 as illustrated in FIG. 3, and the flowchart of FIG. 4, the method begins in block 401. A request may then be received by bridge circuit 300 (block 402). The request may be from a functional block coupled to bus 308 in response to a transaction initiated by a functional block configured as a bus master and coupled to bus 309, or the request may be the result of a transaction initiated by a functional block coupled to bus 308.

The method then depends on whether the request can be converted to the communication protocol employed on bus 309 (block 403). The determination of whether the request may be converted may be performed by comparing the request against a pre-determined list of allowable transactions, or by any other suitable methods.

When it is determined that the request can be converted, the request is converted (block 404). Master unit 306 may convert the request if the request is a response to a transaction that originated from a master device connected to bus 309. Slave unit 307 may convert the request if the request originated from a block coupled to bus 308. In some embodiments, the request may include time-domain multiplex commands which may be isolated by de-multiplexing circuit 305.

The converted request is then send to the intended recipient (block 405). In the case that the request is in response to a transaction initiated by a master device coupled to bus 309, master unit 306 may send the converted request. When the original request included multiple read or write commands, the isolated commands may be sent on separate read and write channels on bus 309. In cases when a functional block coupled to bus 308 originated the request, slave unit 307 may send converted request to the intended recipient. The method then concludes in block 406.

When it is determined that the request cannot be converted, the request is flagged (block 407). In some embodiments, flag may be one or more data bits set by bridge circuit 300 to note that the request could not be converted to the desired communication protocol. In other embodiments, the corresponding transaction for the desired communication protocol may be generated and flagged as well. The flagged request or the flagged converted request may then be sent to the intended recipient (block 408). As described above, either master unit 306 or slave unit 307 may send the flagged request dependent upon where the request originated from. With the sending of the flagged request, the method concludes (block 406).

It is noted that the method depicted in the flowchart illustrated in FIG. 4 is merely an example. In other embodiments, different operations and different order of operations are possible and contemplated.

Figure 5:
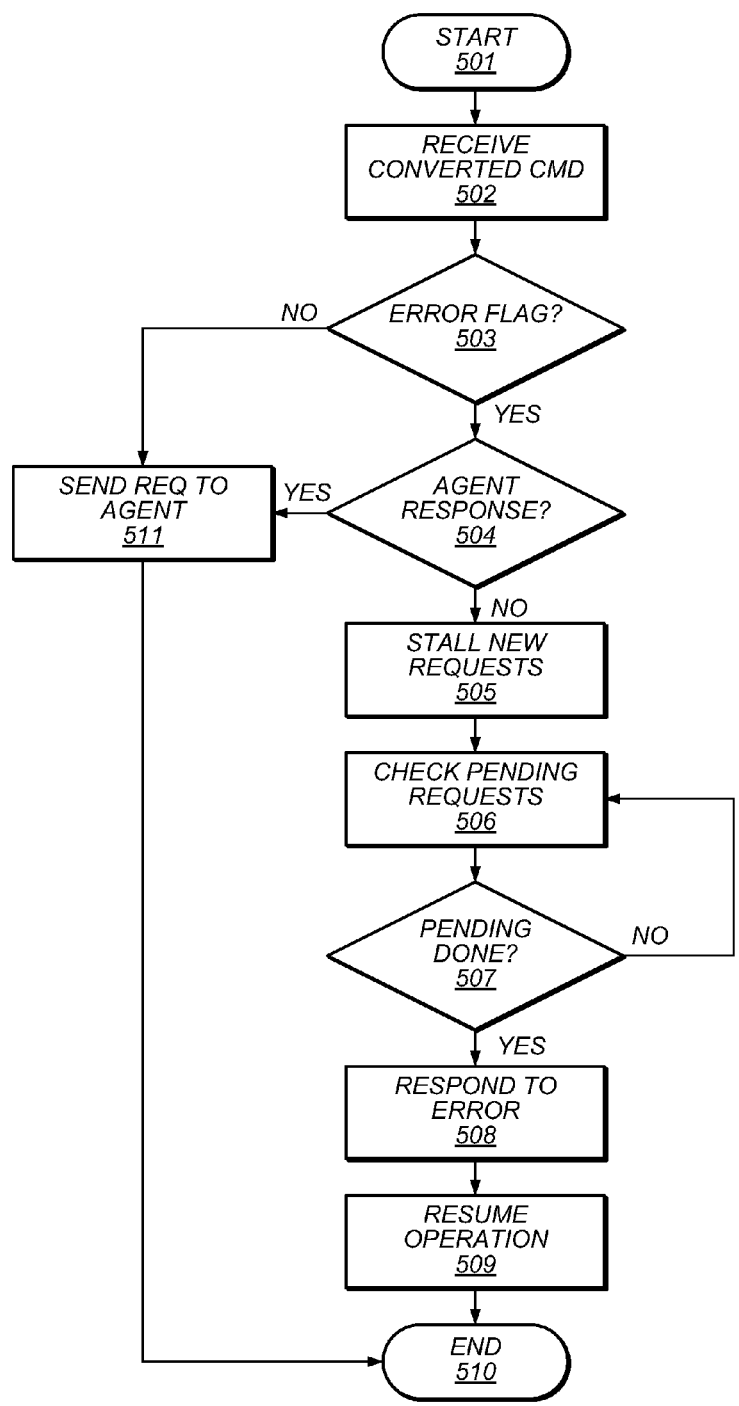
FIG. 5 illustrates a flowchart of an example method for operating a system employing bridge and error circuits.

Turning to FIG. 5, a flowchart depicting a method for operating an SoC, such as SoC 200 as depicted in FIG. 2, is illustrated. Referring collectively to the SoC depicted in FIG. 2, and the flowchart illustrated in FIG. 5, the method begins in block 501. A converted transaction may then be received by a functional block (block 502). The converted transaction may be the result of bridge circuit 205 receiving a transaction from memory 202, processor 201, or graphics controller 203, for read or write PIO access to I/O block 204. The transaction may be in response to an initial request from I/O block 204 to one of the aforementioned blocks.

The method then depends on if the converted transaction contains an error flag (block 503). In some embodiments, the error flag may be one or more data bits set by bridge circuit 205 in response to a determination that the transaction could not be properly converted into the desired communication protocol. The detection of the error flag may be performed by an error circuit, such as, e.g., error circuit 206, or by the intended recipient of the converted transaction, such as I/O block 204, for example.

When no error flag is detected, the converted transaction is sent to the intended recipient (block 511). The recipient, such as I/O block 204, may then complete the commands associated with the transaction, such as, a read PIO access, for example. The method then concludes in block 510.

When an error flag is detected, the method then depends on whether the intended recipient of the transaction is allowed to respond to the error (block 504). When the intended recipient of the transaction is allowed to respond, the converted transaction is sent onto the intended recipient (block 511). The intended recipient may then respond to the originator of the transaction that is unable to complete the transaction. The method then concludes in block 510.

When the intended recipient of the transaction is not allowed to respond, new requests to the recipient may be stalled (block 506). In some embodiments, new requests may be stalled by error circuit 206, or any other suitable circuit for processing evaluating transactions before the transactions are send to their intended recipients. Pending requests (transactions) may then be examined (block 506). The method then depends on the state of the pending transactions (block 507).

When there are more pending requests than just the request with the error, the error circuit continues to monitor the state of the pending requests (block 506). When only the request with the error remains, the error circuit responds to the error (block 508). In some embodiments, the error circuit may tag the response with an error flag. Once the response has been sent, the error circuit allows resumption of normal operation (block 509). With normal operation resuming, the method concludes in block 510.

In the method illustrated in FIG. 5, the operations are depicted as being performed in a sequential fashion. In other embodiments, one or more of the operations may be performed in parallel.

Numerous variations and modifications will become apparent to those skilled in the art once the above disclosure is fully appreciated. It is intended that the following claims be interpreted to embrace all such variations and modifications.

What is claimed is:

1. A bridge circuit, comprising:
an interface unit coupled to a first bus employing a first communication protocol, wherein the interface unit includes:
a transmission unit configured to encode and transmit transactions on the first bus; and
a receive unit configured to receive and decode transactions from the first bus;
a master unit coupled to the interface unit and a second bus employing a second communication protocol, wherein the master unit is configured to:
convert transactions received from the second bus to the first communication protocol;
transmit the converted transactions on the first bus through the interface unit; and
flag a transaction that cannot be converted to the first communication protocol; and
a slave unit coupled to the interface unit and the second bus, wherein the slave unit is configured to convert transactions received from the first bus through the interface unit to the second communication protocol;
wherein to flag the transaction that cannot be converted to the first communication protocol, the master unit is further configured to compare the transactions received from the second bus to a predetermined list of allowable transactions.

2. The bridge circuit of claim 1, wherein to flag a transaction that cannot be converted to the first communication protocol, the master unit is further configured to set one or more bits of the transaction to a pre-determined value.

3. The bridge circuit of claim 1, wherein the interface unit includes a multiplex unit, wherein the multiplex unit is configured to multiplex commands received from the master unit in a time-domain multiplexed fashion.

4. The bridge circuit of claim 1, wherein the interface unit includes a de-multiplex unit, wherein the de-multiplex unit is configured to de-multiplex time-domain multiplexed commands received via the first bus.

5. A method, comprising:
sending a transaction from a first functional block coupled to a first interface to a second functional block coupled to a second interface, wherein the first interface employs a first communication protocol, and wherein the second interface employs a second communication protocol;
determining the transaction cannot be converted from the first communication protocol to the second communication protocol;

marking the transaction with an error flag responsive to the determination that the transaction cannot be converted; and receiving the transaction marked with the error flag by the second functional block;

wherein marking the transaction with an error flag includes comparing the transaction to a predetermined list of allowable transactions.

6. The method of claim 5, wherein marking the transaction with an error flag comprises setting one or more data bits to a pre-determined value.

7. The method of claim 5, wherein determining the transaction cannot be converted to the second communication protocol comprises comparing the transaction to a pre-determined list of allowable transactions.

8. The method of claim 5, wherein receiving the transaction marked with the error flag comprises stalling new transactions from being sent to the second functional block.

9. The method of claim 8, further comprising detecting the completion of transactions pending execution by the second functional block prior to the second functional block receiving the transaction marked with the error flag.

10. The method of claim 9, further comprising sending a response to the first functional block responsive to receiving the transaction marked with the error flag.

11. The method of claim 10, wherein sending the response to the first functional block is dependent upon detecting the completion of transactions pending execution by the second functional block prior to second functional block receiving the transaction marked with the error flag.

12. A system, comprising:
a first functional block coupled to an internal bus of an integrated circuit, wherein the first functional block is configured to send transactions encoded with a first communication protocol;
a bridge circuit coupled to the internal bus, wherein the bridge circuit is configured to:
convert a transaction encoded with the first communication protocol to a transaction encoded with a second communication protocol; and
determine if a transaction encoded with the first communication protocol cannot be converted to the second communication protocol;
a second functional block coupled to the bridge circuit, wherein the second functional block is configured to receive transactions encoded with the second communication protocol;
wherein to determine if the transaction encoded with the first communication protocol cannot be converted to the second communication protocol, the bridge circuit is further configured to compare the transaction encoded with the first communication protocol to a predetermined list of allowable transactions.

13. The system of claim 12, wherein the bridge circuit is further configured to flag the transaction encoded with the first communication protocol to generated a flagged transaction in response to the determination that the transaction cannot be converted to the second communication protocol.

14. The system of claim 13, further comprising an error circuit coupled to the bridge circuit and the second functional block, wherein the error circuit is configured to detect the flagged transaction.

15. The system of claim 14, wherein the error circuit is further configured to stall new transactions to the second functional block in response to the detection of the flagged transaction.

16. The system of claim 14, wherein the second functional unit is further configured to respond to the flagged transaction.

17. The system of claim 16, wherein the error circuit is further configured to generate an error response, in response to a determination that the second functional block does not respond to the flagged transaction.

* * * * *